United States Patent

Blehert et al.

[11] Patent Number: 5,611,105
[45] Date of Patent: Mar. 18, 1997

[54] TORSIONALLY FLEXIBLE FRAME STRUCTURE

[75] Inventors: Michael L. Blehert, Crystal; Robert A. Geyer, Champlin, both of Minn.

[73] Assignee: Tennant Company, Minneapolis, Minn.

[21] Appl. No.: 372,512

[22] Filed: Jan. 13, 1995

[51] Int. Cl.$^6$ .......................... A47L 11/29; A47L 11/292
[52] U.S. Cl. .......................... 15/320; 15/340.2; 15/340.4; 15/384; 280/781
[58] Field of Search .................................. 15/320, 340.1, 15/340.2, 340.3, 340.4; 280/781, 800; 296/204, 901

[56] References Cited

U.S. PATENT DOCUMENTS

| | | | |
|---|---|---|---|
| 4,492,002 | 1/1985 | Waldhauser et al. | 15/320 |
| 4,667,364 | 5/1987 | Meili | 15/320 |
| 4,956,891 | 9/1990 | Wulff | 15/320 |
| 5,238,267 | 8/1993 | Hutchison et al. | |
| 5,369,838 | 12/1994 | Wood et al. | 15/320 |

*Primary Examiner*—David Scherbel
*Assistant Examiner*—Terrence R. Till
*Attorney, Agent, or Firm*—Dorn, McEachran, Jambor & Keating

[57] ABSTRACT

A floor scrubber has four wheels for stable support on the floor. These wheels are attached to the underside of a resilient molded plastic frame so that any vertical movement of any of the wheels is transmitted directly to the frame. The frame is ribbed to be stiff in longitudinal bending, but torsionally the frame is somewhat flexible. The scrubber body, which is attached to the upper side of the frame and is supported by the frame, is also a molded plastic part which is somewhat flexible. The weight of the body and its contents keeps all four wheels on the floor at all times, even when the floor is uneven, by flexing the frame and body as needed. This structural flexibility eliminates any need for an additional means to keep all the wheels on the floor, such as a sprung suspension or a center pivoted axle.

5 Claims, 5 Drawing Sheets

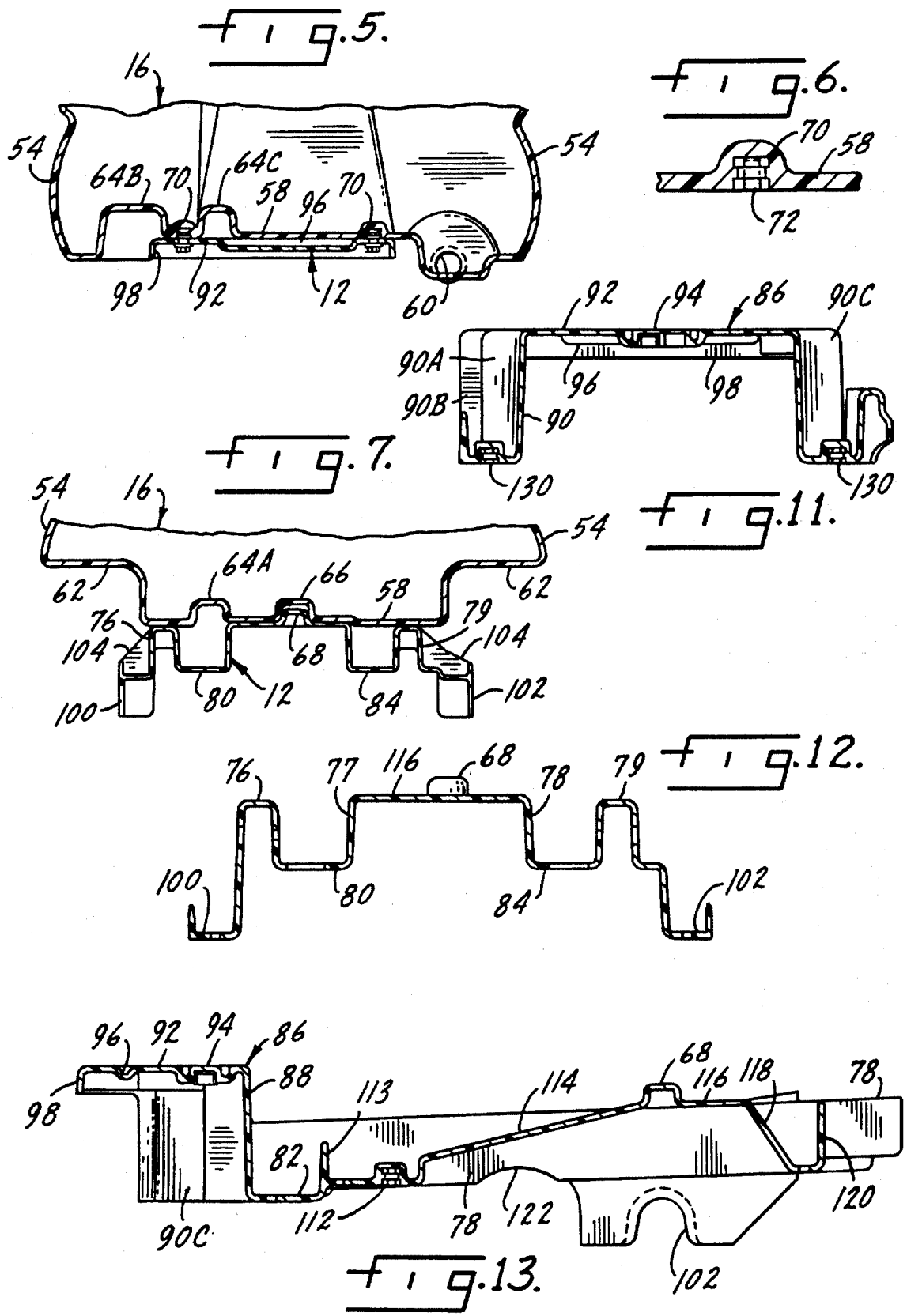

TORSIONALLY FLEXIBLE FRAME STRUCTURE

BACKGROUND OF THE INVENTION

Vehicles are commonly made of steel, but in recent years designers have substituted plastic for steel in some areas of vehicle design. The automotive industry has been prominent in this trend, mainly because plastic parts can save weight, which translates into improved fuel economy. The corrosion resistance of plastic parts is also attractive in some vehicle designs, and manufacturing costs can sometimes be lowered by substituting one molded plastic part for a fabricated assembly of several metal parts.

The trend toward plastics in place of metal has moved very cautiously regarding the main structural members of vehicles, such as their frames, where stiffness and strength are regarded as critical, but this area is starting to be considered for plastics applications. For example, U.S. Pat. No. 5,238,267 discloses a riding lawn mower in which a plastic base and two plastic half shells are adhesively bonded together to form a unitized body and frame. This monocoque structure is designed to emphasize stiffness. Various metal parts are attached to it, such as a modular engine and transaxle with wheels and a steerable center pivoted rocking axle with wheels.

Many plastics possess substantial elastic resilience. This has been utilized, for example, in archery bows made of reinforced plastic. Vehicle applications, however, have not capitalized on this elastic resilience in designing structural parts. For such uses flexibility has been considered more of a detriment than an advantage, and designers have endeavored to make their plastic parts approach as far as possible the stiffness of steel. It has not been recognized that flexible structural parts made of resilient plastics can be used to advantage in some vehicles.

SUMMARY OF THE INVENTION

The present invention advantageously uses flexible vehicle structural parts made of resilient plastics. An exemplary vehicle is disclosed, which is a floor scrubber. It has a body molded of a resilient plastic material with its bottom attached to the upper side of a main frame which is also molded of a resilient plastic material. The parts serve the usual functions of comparable parts on prior art floor scrubbers. The body is essentially a tank for holding soiled scrubbing solution recovered from the floor, with a set of batteries which power the machine nested in the upper part of it. At least the lower part of the body may be thought of as a plastic tank. It is wider than the frame and overhangs the frame on both sides. The bottom of this tank has molded longitudinal channels which transfer the weight borne by the scrubber body to the frame. However, there are no X-braces or other forms in the tank bottom to impart torsional stiffness to it.

A drive axle and an electric drive motor are attached to the underside of the frame near its forward end, and the two drive wheels on the axle ends support the front end of the frame. Two caster wheels attached to the underside of the frame near its rear end support it there. Attaching these four supporting wheels to the frame in this way has the effect that any vertical movement up or down of any of the wheels is transmitted directly to the frame.

The frame has longitudinal channels molded into it which provide beam strength and stiffness from front to rear to transfer the weight of the main body to the wheels, but it has no X-braces or other forms designed to impart torsional stiffness to it. Thus if it is not evenly supported by the wheels it can be twisted somewhat by the weight of the main body and its contents. The frame and body are held together by bolts which pass up through holes in the frame and screw into threaded inserts molded into the bottom of the main body or recovery tank.

Floor scrubbers may have three or four wheels, but four wheels provide better stability and so are preferred. This has been found to be true with other types of vehicles also, such as, for example, golf carts and all-terrain vehicles. Floor scrubbers typically operate on floors which are not absolutely level. It is common for a high or low spot in a floor to raise or lower one or another of a scrubber's wheels. If there are four wheels and they support a rigid frame, such as a steel weldment or an aluminum casting, in the manner in which the wheels support the frame of the present invention as described above, then one or another of the wheels may be lifted off of the floor from time to time. This compromises tire weight distribution and traction, and makes steering control more difficult.

Prior art vehicles had rigid frames, and designers dealt with this problem by providing either a sprung suspension, as in automobiles, or a center pivoted rocking front axle, as is common in farm and lawn tractors and some riding lawn mowers. The riding lawn mower disclosed in the '267 patent referred to earlier has a center pivoted rocking front axle assembly.

In the floor scrubber exemplifying the present invention, when one wheel passes over a low or high spot in the floor the weight of the machine causes the frame and at least a central portion of the bottom of the body to flex torsionally, or twist, until the affected wheel conforms to the floor. This maintains normal weight distribution on all of the wheels, normal traction on the drive wheels, and normal steering control. The twisting also absorbs energy, which softens the impact to other machine components when driving on a rough floor.

The invention thus allows all of the wheels to maintain continuous firm contact with the floor, although it may be uneven, without any need for a sprung suspension system or a center pivoted rocking axle. This simplified design provides substantial cost reduction and serviceability improvement, and represents a significant advance in the state of the art in the use of plastics for vehicle structural parts.

BRIEF DESCRIPTION OF THE DRAWINGS

FIG. 5 is a section taken along line 5—5 of FIG. 3.

FIG. 6. is an enlarged detail view of a threaded insert in the lower body section.

FIG. 7 is a section taken along line 7—7 of FIG. 3.

FIG. 11 is a section taken along line 11—11 of FIG. 8.
FIG. 12 is a section taken along line 12—12 of FIG. 9.
FIG. 13 is a section taken along line 13—13 of FIG. 8.

DETAILED DESCRIPTION OF THE INVENTION

Figure 1:
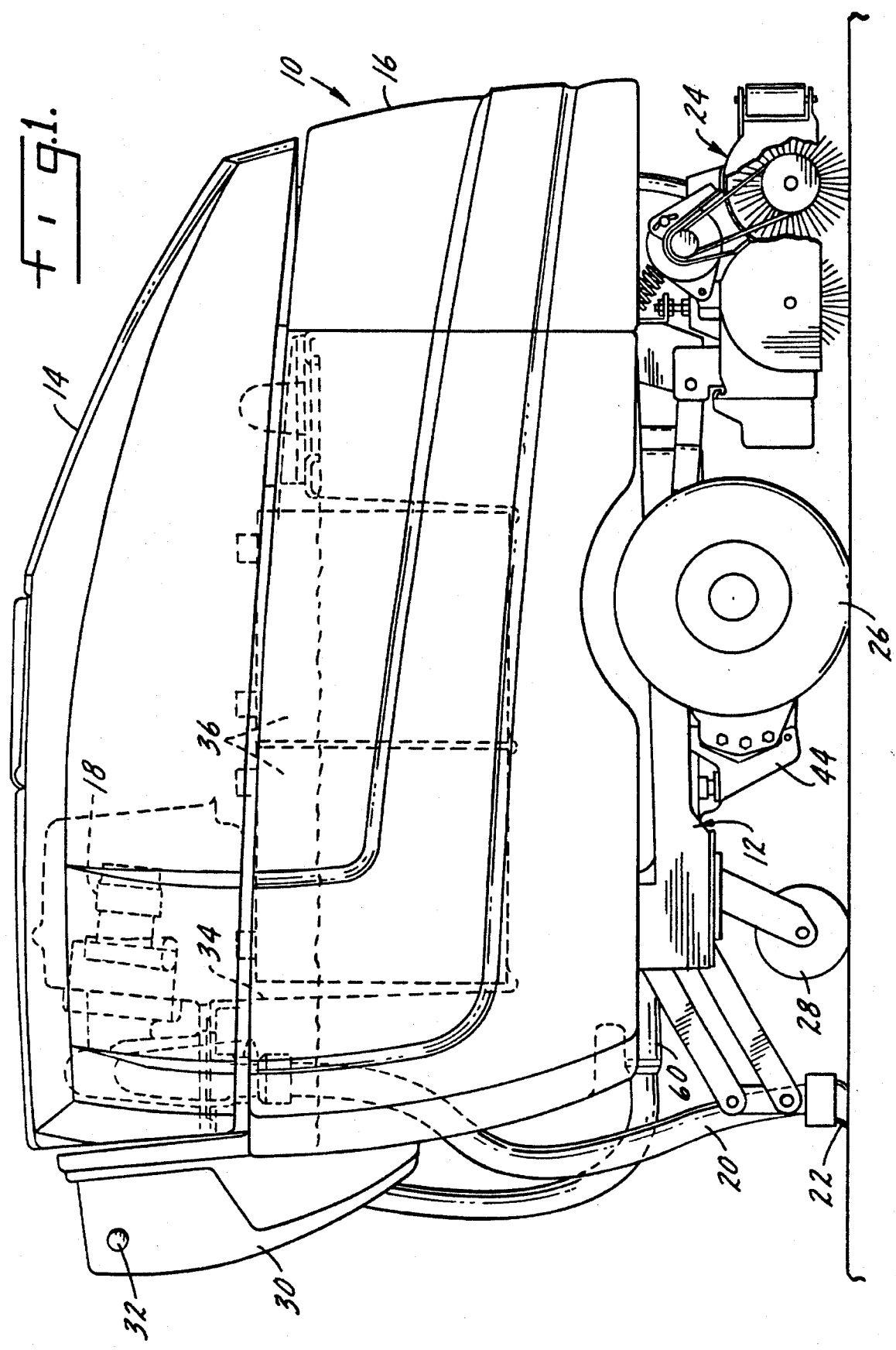
FIG. 1 is a side elevation view of a floor scrubber incorporating the flexible frame of the present invention.

FIG. 1 illustrates a floor scrubber 10 incorporating the flexible frame 12 of the present invention. While the invention is shown and described in terms of a floor maintenance machine, in this case a walk-behind scrubber, it will be understood that the invention could be applied to other vehicular applications. The scrubber has a molded plastic body including upper and lower sections 14, 16 joined together by hinges so the upper section can be lifted for access to the interior of the body. The upper section 14 houses a vacuum fan 18 and a solution tank for holding fresh liquid cleaning solution. The vacuum fan creates a low pressure zone in a receiving tank formed in the lower section 16 of the body. The receiving tank communicates with a hose 20 which is connected to a squeegee 22 at the rear of the machine. Cleaning solution is supplied to a scrub head 24 at the front of the machine. The scrub head includes the usual brushes, drives and support elements. Soiled cleaning solution is recovered by the squeegee and delivered through hose 20 to the receiving tank. The scrubber 10 has floor-engaging drive wheels 26 and casters 28. A suitable control module 30 including steering handles 32 is attached to the lower body section 16. The lower section includes a compartment 34 for batteries 36 which power the scrub head 24, vacuum fan 18, drive wheels 26 and other scrubber components.

Figure 2:
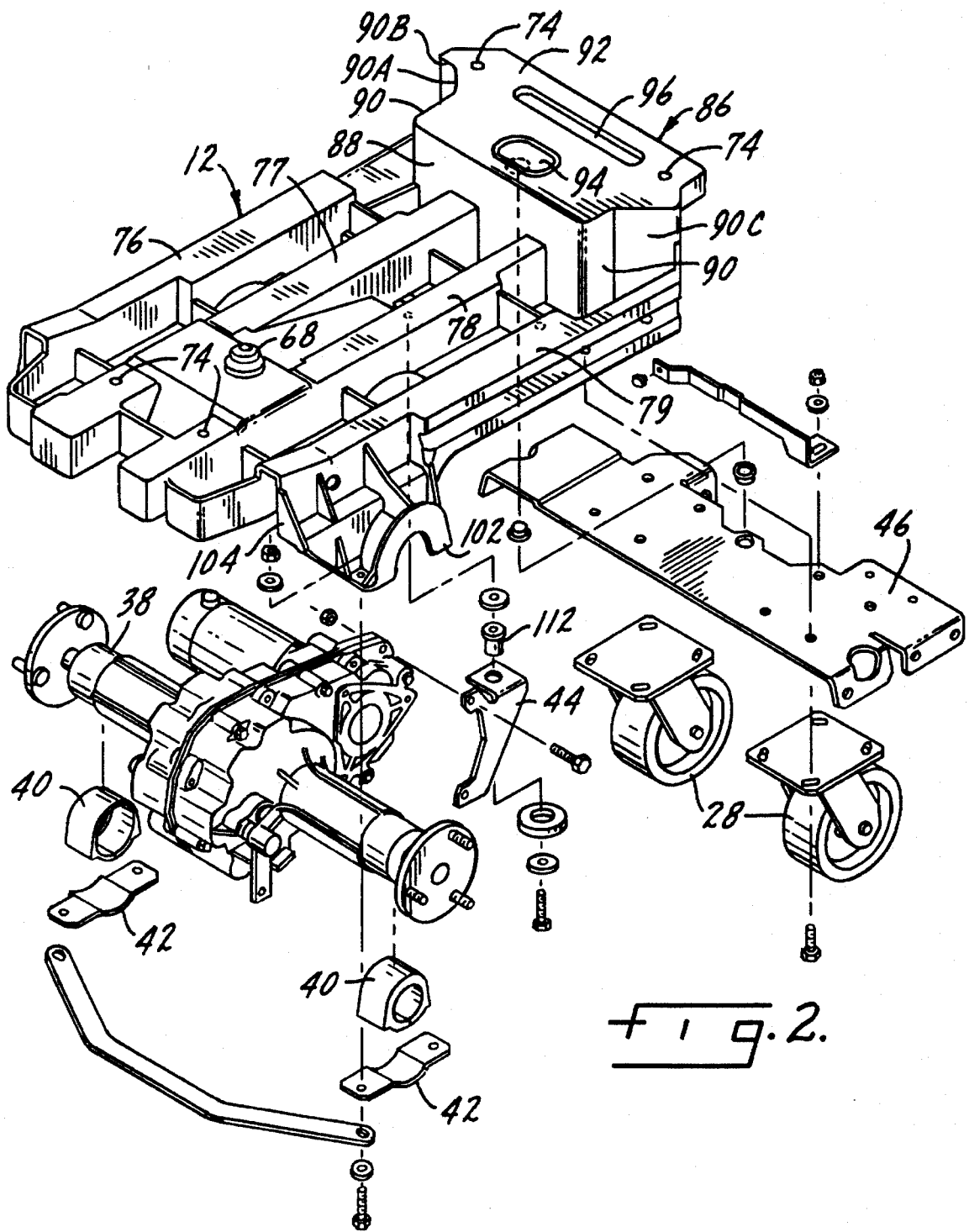
FIG. 2 is an exploded perspective view of the flexible frame and its undercarriage including a transaxle assembly and casters.
Figure 3:
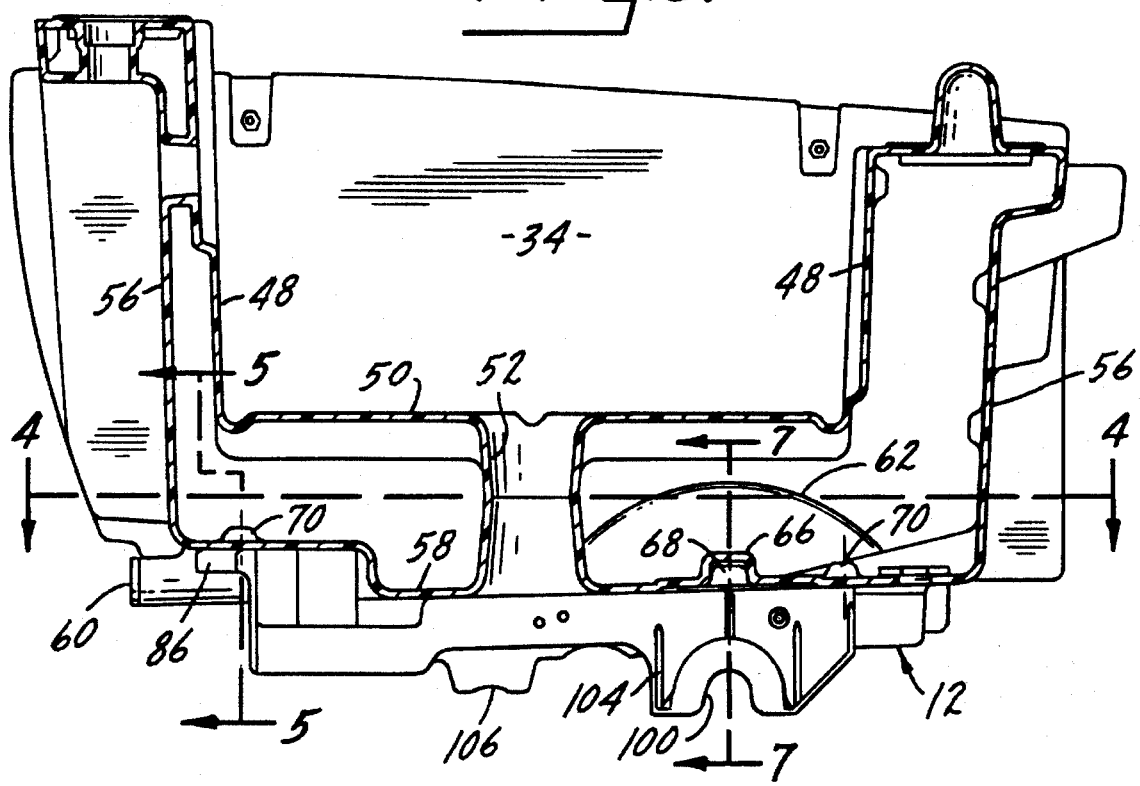
FIG. 3 is longitudinal section of the frame and lower body section.
Figure 4:
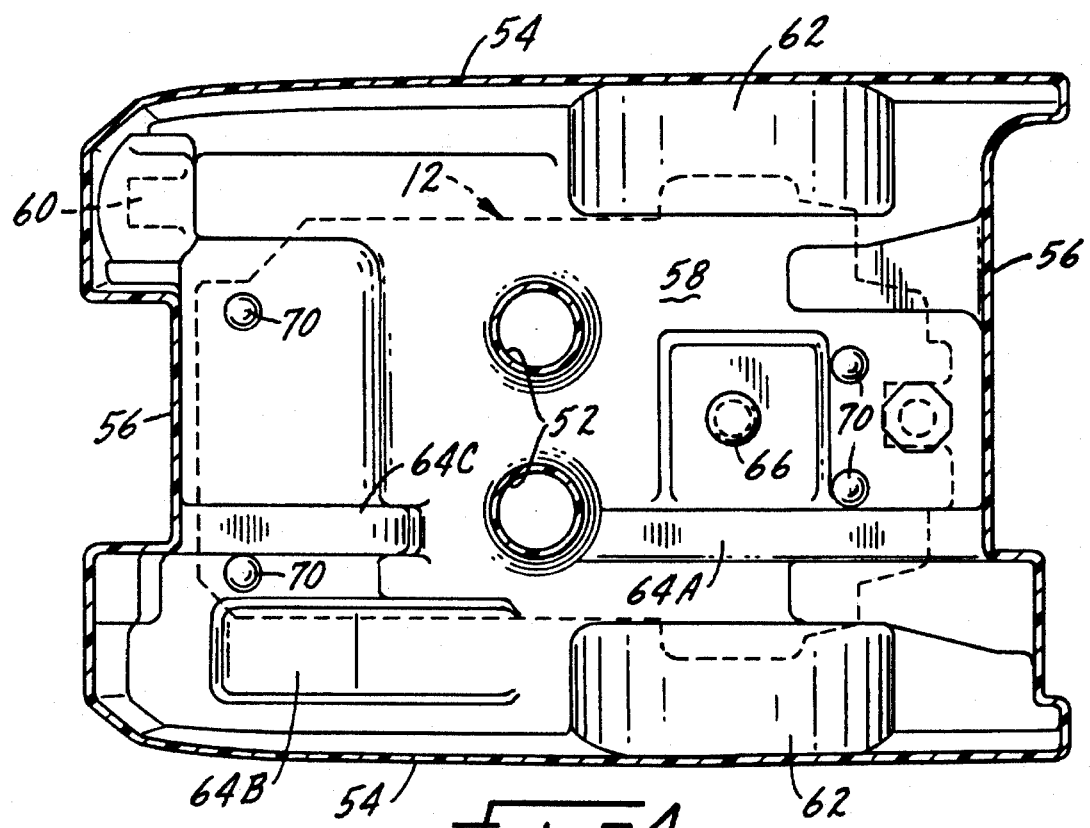
FIG. 4 is a section taken along line 4—4 of FIG. 3.

Looking now at FIG. 2, the frame 12 is shown together with the undercarriage of the scrubber. The undercarriage includes a transaxle assembly 38 mounted in isolator bushings 40 which are fastened to the frame 12 by clamps 42. A transaxle bracket 44 is attached to the frame and the rear portion of the transaxle to fix its orientation. The drive wheels 26 attach to the ends of the transaxle. Casters 28 are mounted on a steel caster pad bracket 46 which in turn is bolted to the underside of the frame.

FIGS. 3–7 illustrate details of the lower body section 16 and how it is joined to the frame 12. The battery compartment 34 is defined by internal vertical walls 48 and an internal bottom wall 50 which is supported by pedestals 52. External side walls 54, external front and rear walls 56 and an external bottom wall 58 cooperate with the internal walls to define a cavity surrounding the compartment 34 which serves as a receiving tank for the soiled cleaning solution recovered by the squeegee 22. The receiving tank includes a drain 60. Wheel wells 62 and stiffening channels 64A, 64B and 64C are incorporated in the external bottom wall. Further details of the receiving tank are shown in co-pending U.S. patent application entitled "Tank Configuration for a Small Floor Scrubber", invented by Robert A. Geyer, Ser. No. 08/372,506, now U.S. Pat. No. 5,566,422, filed on the same day as this application and assigned to the present assignee, the disclosure of which is incorporated herein by reference.

Figure 8:
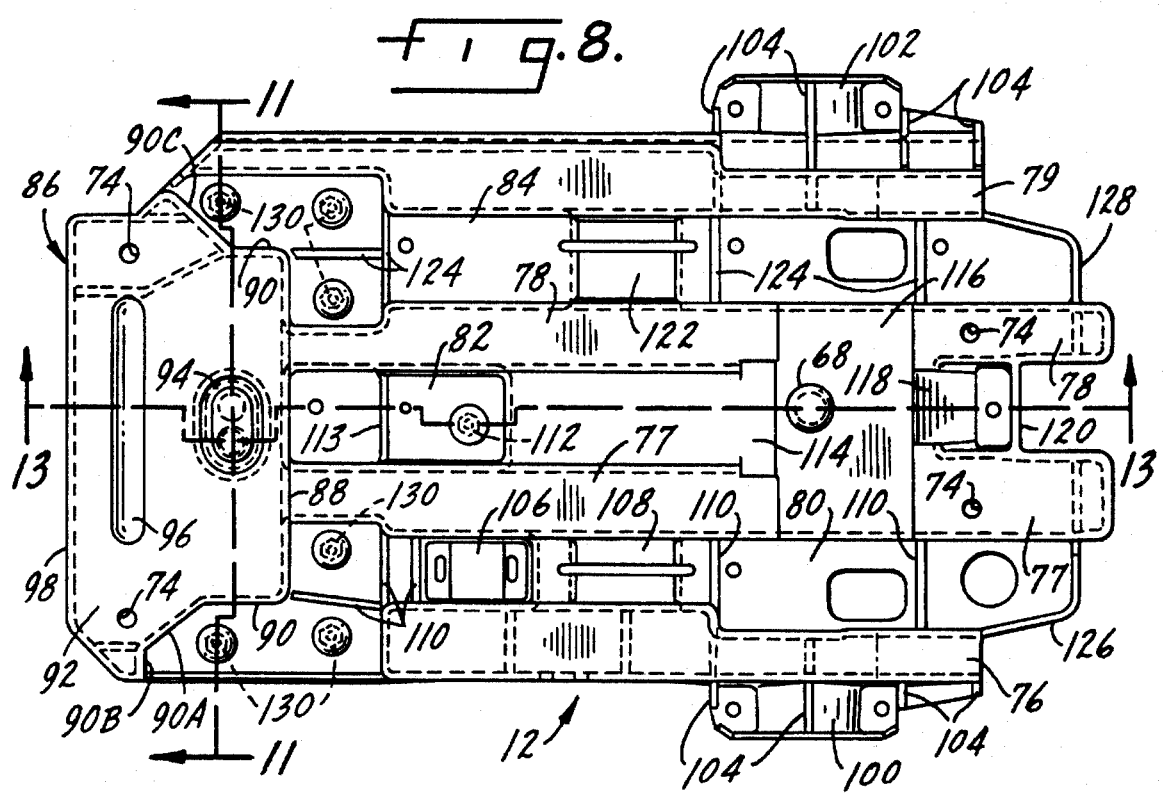
FIG. 8 is a plan view of the flexible frame of the present invention.
Figure 9:
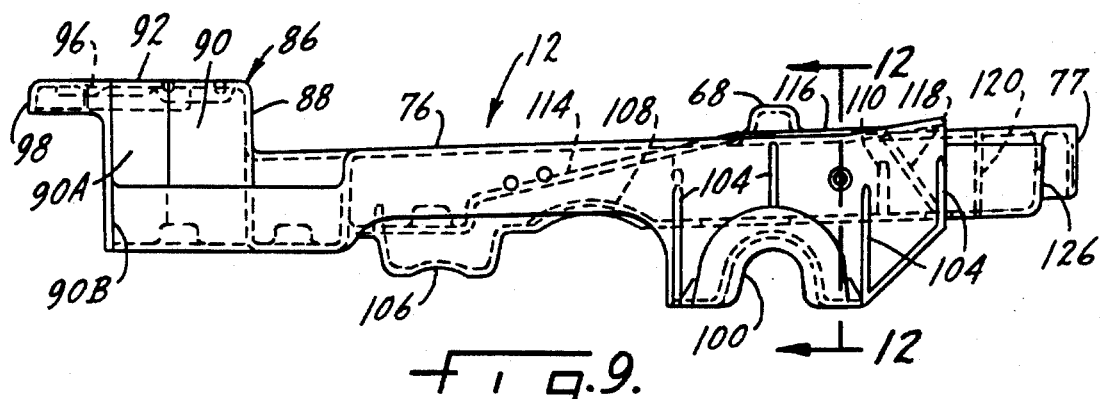
FIG. 9 is a side elevation view of the frame.
Figure 10:
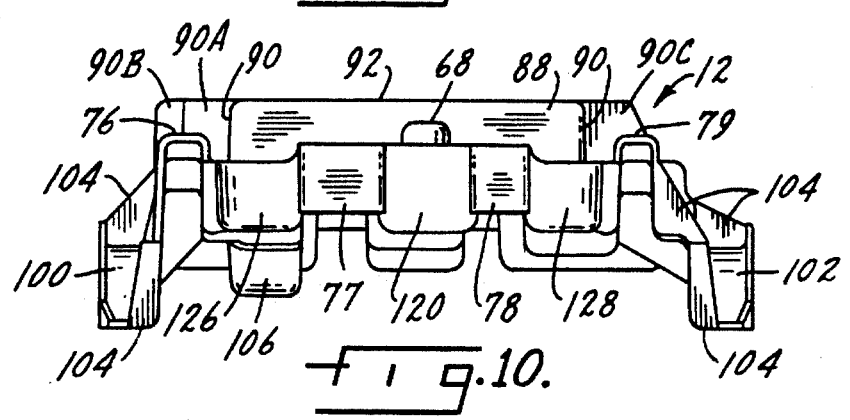
FIG. 10 is a front end elevation view of the frame.

The external bottom wall 58 of the lower section 16 has a socket 66 molded into it. The socket receives a locating knob 68 on the upper surface of the frame 12. The external bottom wall also has four protrusions 70 having threaded metal inserts 72 (FIG. 6) molded therein. The inserts receive bolts which extend through mounting holes 74 (FIGS. 2 and 8) in the frame for securing the lower section to the frame.

FIGS. 8–13 show the frame 12 in detail. It is preferably made of polypropylene which is about 40% glass reinforced. Essentially the frame has four longitudinal channels 76, 77, 78 and 79 joined by webs 80, 82 and 84. The channels generally comprise three surfaces or walls. Thus, they are open on the bottom as best seen in FIG. 12. The channels extend from the front of the frame to a generally upstanding box section 86 at the rear of the frame. The box section has a front panel 88 joining side walls 90 which flare out at 90A, 90B and 90C. The box section 86 includes a deck 92 overlying panel 88 and walls 90 and having a bearing boss 94, a lateral depression 96 and a rear lip 98. Two of the holes 74 for attaching the lower body section are also formed in the deck 92.

Isolator mounts 100, 102 extend from the outer channels 76 and 79, respectively. A plurality of triangular gussets 104 strengthen the attachment of the mounts to the channels. The mounts 100, 102 receive the isolator bushings 40 and clamps 42.

The details of the individual webs 80, 82 and 84 vary from one to another. For example, web 80 has a depression 106 adjacent a rounded crown portion 108. A series of plates 110 extend across the web 80. Web 82 starts at the back at panel 88 and includes an insert 112 for mounting the bracket 44. An upstanding partition 113 on web 82 connects channels 77 and 78. A ramp 114 adjacent the insert 112 is inclined upwardly to a bridge portion 116 which merges with the channels 77 and 78. The bridge contains the locating knob 68. The forward portion of web 82 ramps down at 118 to a front wall 120. Web 84 has a crown 122 similar to that of web 80. Plates 124 connect channels 78 and 79. To the front of the frame the webs 80 and 84 terminate at front walls 126 and 128, respectively. At the rear of the frame the webs 80 and 84 wrap around the box section 86 to adjoin the side walls 90. These areas of the webs contain threaded inserts 130 for attachment of the caster pad bracket 46.

It can be seen that the channels 76–79 provide longitudinal rigidity to the frame but the absence of corresponding lateral structures allows for torsional flexibility. In a sense the frame can be thought of as having a corrugated shape, as perhaps best illustrated in FIG. 12. Since the corrugations run longitudinally the frame resists longitudinal bending. The various plates or gussets 110, 113, 124, 126 and 128 add some torsional stiffness but not so much as to prevent flexing to accommodate unevenness in the floor, as described above.

While a preferred form of the invention has been shown and described, it will be realized that alterations and modifications may be made thereto without departing from the scope of the following claims.

We claim:

1. A floor scrubber having a resilient plastic frame and a mating resilient plastic receiving tank set upon and attached to that frame, a plurality of wheels supporting the frame, all of said wheels being attached to the underside of said frame and all of which contact a supporting surface, the frame and tank being structurally stiffened longitudinally to transfer the weight of the floor scrubber to the wheels, the frame and tank being less stiff torsionally, whereby the frame and tank may twist to allow the wheels to conform to irregularities in the supporting surface and maintain all four wheels in contact with the surface at all times, even in high and low areas.

2. The floor scrubber of claim 1 in which the frame is made of polypropylene which is about 40% glass reinforced such that as the scrubber travels over an irregular supporting surface, twisting of the frame and tank absorbs energy, which softens the impact to other components that occurs when one of the wheels contacts an irregularity in the surface.

3. A frame for a vehicle which is supported by a plurality of wheels, the frame comprising a plurality of elongated channels which are spaced apart laterally, a box section joining one end of the channels, a web extending between each adjacent pair of channels, joining the channels together into a unified frame, and attachment means formed in the frame for connecting said wheels directly to the frame, the channels and webs being molded from a resilient plastic material to make a frame that is longitudinally stiff but torsionally weak such that flexing of the frame will maintain the wheels in contact with an uneven supporting surface.

4. A frame for a vehicle which is supported by a plurality of wheels, the frame comprising a plurality of elongated channels which are spaced apart laterally, a bridge portion connecting at least two of the channels, a web extending between each adjacent pair of channels, joining the channels together into a unified frame, and attachment means formed in the frame for connecting said wheels directly to the frame, the channels and webs being molded from a resilient plastic material to make a frame that is longitudinally stiff but torsionally weak such that flexing of the frame will maintain the wheels in contact with an uneven supporting surface.

5. A frame for a vehicle which is supported by a plurality of wheels, the frame comprising a plurality of elongated channels which are spaced apart laterally, the channels having a generally rectangular structure which is closed on three sides and open on the fourth side, a web extending between each adjacent pair of channels, joining the channels together into a unified frame, and attachment means formed in the frame for connecting said wheels directly to the frame, the channels and webs being molded from a resilient plastic material to make a frame that is longitudinally stiff but torsionally weak such that flexing of the frame will maintain the wheels in contact with an uneven supporting surface.

* * * * *